(12) United States Patent
Puiu

(10) Patent No.: US 6,971,494 B2
(45) Date of Patent: *Dec. 6, 2005

(54) TORQUE TRANSFER COUPLING WITH FRICTION CLUTCH AND HYDRAULIC CLUTCH ACTUATOR

(75) Inventor: Dumitru Puiu, Sterling Heights, MI (US)

(73) Assignee: Magna Drivetrain of America, Inc., Troy, MI (US)

( * ) Notice: Subject to any disclaimer, the term of this patent is extended or adjusted under 35 U.S.C. 154(b) by 38 days.

This patent is subject to a terminal disclaimer.

(21) Appl. No.: 10/756,207

(22) Filed: Jan. 13, 2004

(65) Prior Publication Data

US 2005/0153807 A1    Jul. 14, 2005

(51) Int. Cl.[7] .............................................. F16D 19/00
(52) U.S. Cl. ............................... 192/85 AA; 192/93 A; 180/249; 74/650
(58) Field of Search ..................... 192/35, 70.23, 192/85 AA, 93 A; 180/249, 250; 475/86; 74/650

(56) References Cited

U.S. PATENT DOCUMENTS

| | | | |
|---|---|---|---|
| 5,148,900 A | 9/1992 | Mohan | |
| 5,310,388 A | 5/1994 | Okcuoglu et al. | |
| 5,358,454 A | 10/1994 | Bowen et al. | |
| 5,649,459 A | 7/1997 | Murakami et al. | |
| 5,704,863 A | 1/1998 | Zalewski et al. | |
| 5,779,013 A | 7/1998 | Bansbach | |
| 6,041,903 A | * | 3/2000 | Burns et al. ............. 192/85 AA |
| 6,051,903 A | | 4/2000 | Pengov |
| 6,112,874 A | | 9/2000 | Kopp et al. |
| 6,422,365 B2 | * | 7/2002 | Arai et al. ..................... 192/35 |
| 6,450,137 B2 | | 9/2002 | Ogawa |
| 6,450,139 B1 | | 9/2002 | Watanabe |
| 6,578,692 B2 | | 6/2003 | Porter |
| 6,601,554 B1 | | 8/2003 | Schafer et al. |
| 6,626,787 B2 | | 9/2003 | Porter |
| 6,745,879 B1 | * | 6/2004 | Dolan ........................ 192/35 |
| 2001/0011622 A1 | * | 8/2001 | Arai et al. ..................... 192/35 |

* cited by examiner

Primary Examiner—Saul Rodriguez
(74) Attorney, Agent, or Firm—Harness, Dickey & Pierce P.L.C.

(57) ABSTRACT

A hydraulic coupling having a multi-plate friction clutch assembly operably connecting a pair of rotary members and a hydramechanical clutch actuator for automatically controlling engagement of the friction clutch assembly. The clutch actuator includes a hydraulic fluid pump, a hydraulically-actuated rotary operator, and a ball ramp mechanism. The hydraulic fluid pump is operable to draw low pressure fluid from a sump and deliver high pressure fluid to a series of actuation chambers defined between coaxially aligned first and second components of the rotary operator. The magnitude of the fluid pressure delivered to the actuation chamber controls the angular movement of the second component relative to the first component. Translational movement of the second cam member results in a compressive clutch engagement force being exerted on the friction clutch assembly, thereby controlling the drive torque transferred from the first rotary member to the second rotary member.

64 Claims, 13 Drawing Sheets

TORQUE TRANSFER COUPLING WITH FRICTION CLUTCH AND HYDRAULIC CLUTCH ACTUATOR

FIELD OF THE INVENTION

The present invention relates generally to torque couplings for use in motor vehicle driveline applications. In particular, the present invention relates to a torque coupling having a transfer clutch disposed between a pair of rotary members and a hydramechanical clutch actuator for controlling actuation of the transfer clutch.

BACKGROUND OF THE INVENTION

Hydraulic couplings are used in a variety of motor vehicle driveline applications for limiting slip and transferring drive torque between a pair of rotary members. In four-drive applications, hydraulic couplings have been used to automatically control the transfer of drive torque from a driven member to a non-driven member in response to speed differentiation therebetween. In limited slip applications, such as in association with a differential in an axle assembly, full-time transfer case, or transaxle, hydraulic couplings have been used to limit slip and bias the torque split between two rotary output members. Examples of hydraulic couplings which are adaptable for such driveline applications include viscous couplings, geared traction units, and passively and electronically-controlled hydraulically-actuated friction clutches that are generally similar to those shown and described in U.S. Pat. Nos. 5,148,900, 5,310,388, 5,358, 454, 4,649,459, 5,704,863, 5,779,013, and 6,051,903.

SUMMARY OF THE INVENTION

It is an objective of the present invention to provide a hydraulic coupling for use in motor vehicle driveline applications for rotatively coupling a pair of rotary members so as to limit speed differentiation and transfer drive torque therebetween.

It is a further objective of the present invention to provide a hydraulic coupling with an improved clutch actuator assembly for controlling actuation of a multi-plate clutch assembly in response to speed differentiation between the a pair of rotary members.

It is another objective of the present invention to provide an improved hydraulic coupling for use as an on-demand torque transfer device in four-wheel drive vehicles to automatically transfer drive torque from the primary driveline to the secondary driveline in response to and as a function of the speed difference therebetween.

As a related objective of the present invention, the hydraulic coupling is further applicable for use in association with a differential for providing an inter-axle or intra-axle limited slip control feature.

These and other objectives of the present invention are realized by providing a hydraulic coupling having a multi-plate friction clutch assembly operably connecting a pair of rotary members and a hydramechanical clutch actuator for automatically controlling engagement of the friction clutch assembly. The clutch actuator includes a hydraulic fluid pump, a hydraulically-actuated rotary operator, and a ball ramp mechanism. The hydraulic fluid pump is operable to draw low pressure fluid from a sump and deliver high pressure fluid to a series of actuation chambers defined between coaxially aligned first and second components of the rotary operator. The magnitude of the fluid pressure delivered to the actuation chamber controls the angular movement of the second component relative to the first component. Since the second component is fixed to a first cam member of the ball ramp mechanism, such angular movement acts to energize the ball ramp mechanism for axially displacing its second cam member. Such translational movement of the second cam member results in a compressive clutch engagement force being exerted on the friction clutch assembly, thereby controlling the drive torque transferred from the first rotary member to the second rotary member.

As a further feature of the hydraulic coupling, the rotary operator includes a pressure limiting feature so as to limit the maximum drive torque that can transferred across the friction clutch assembly.

BRIEF DESCRIPTION OF THE DRAWINGS

Further objectives, features and advantages of the present invention will become apparent to those skilled in the art from analysis of the following written description, the appended claims, and the accompanying drawings in which:

DETAILED DESCRIPTION OF THE PREFERRED EMBODIMENTS

The present invention is directed to a new and improved hydraulic coupling that is adapted for use in motor vehicle driveline applications to transfer torque and limit speed differentiation between a pair of rotary members. Driveline applications contemplated for this hydraulic coupling include, but are not limited to, on-demand clutches in transfer cases and power take-off units, biasing clutches associated with differential units in full-time transfer cases, power take-off units and drive axle assemblies, or any other driveline apparatus required to rotatively couple at least two rotary members.

Figure 1:
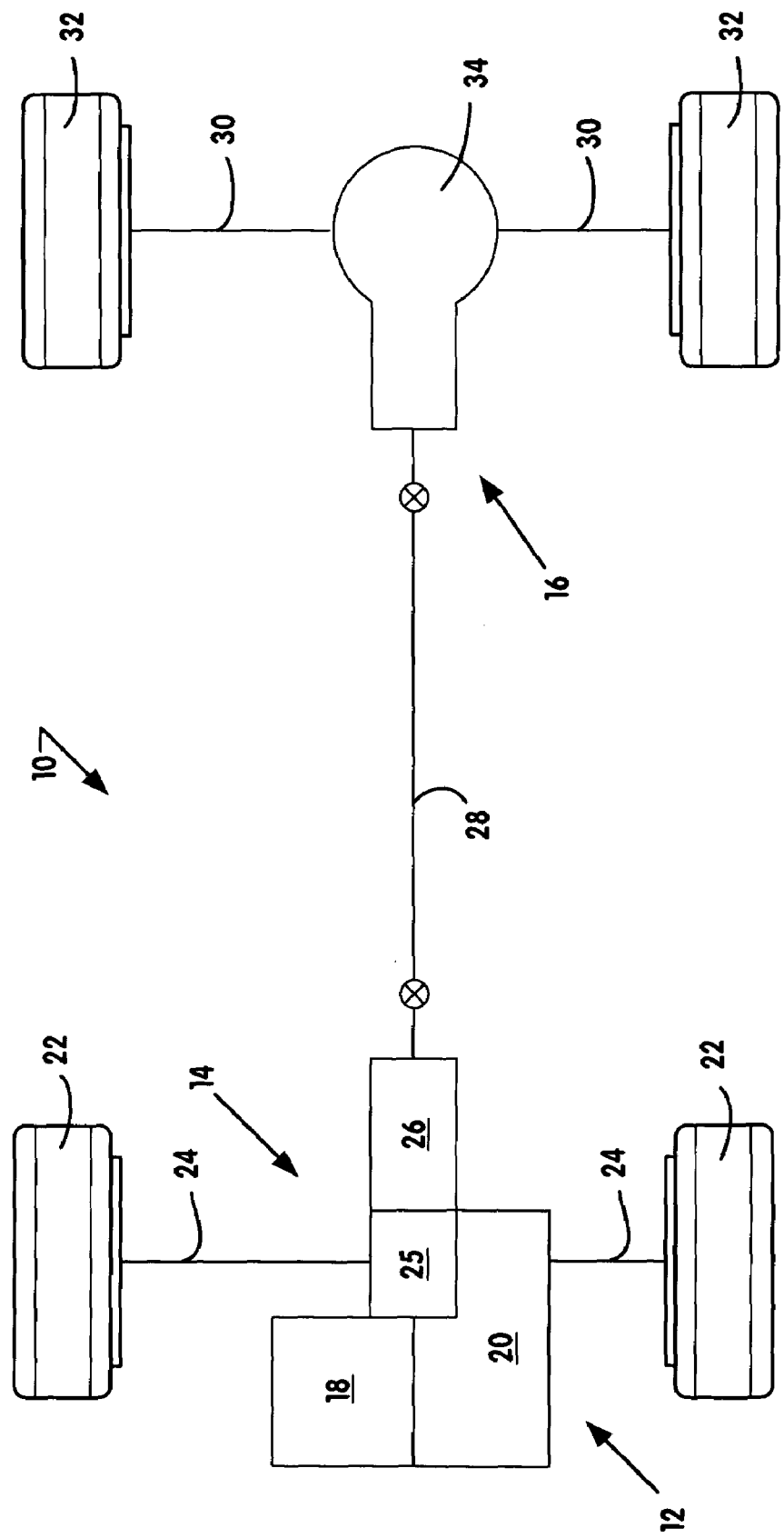
FIG. 1 illustrates the drivetrain of a four-wheel drive vehicle equipped with a power transmission device according to the present invention.

With reference to FIG. 1, a schematic layout of a vehicular drivetrain 10 is shown to include a powertrain 12, a first or primary driveline 14 driven by powertrain 12, and a second or secondary driveline 16. Powertrain 12 includes an engine 18 and a multi-speed transaxle 20 arranged to normally provide motive power (i.e., drive torque) to a pair of first wheels 22 associated with primary driveline 14. Primary driveline 14 further includes a pair of axleshafts 24 connecting wheels 22 to a differential unit 25 associated with transaxle 20. Secondary driveline 16 includes a power take-off unit (PTU) 26 driven by the output of transaxle 20, a propshaft 28 driven by PTU 26, a pair of axleshafts 30 connected to a pair of second wheels 32, and a drive axle assembly 34 that is operable to selectively transfer drive torque from propshaft 28 to axle halfshafts 30. As will be appreciated, this particular drivetrain arrangement defines a front-wheel based four-wheel or all-wheel drive vehicle. In accordance with this invention, drive axle assembly 34 functions to transfer drive torque "on-demand" to second wheels 32 in response to lost traction at the first wheels 22.

Figure 2:
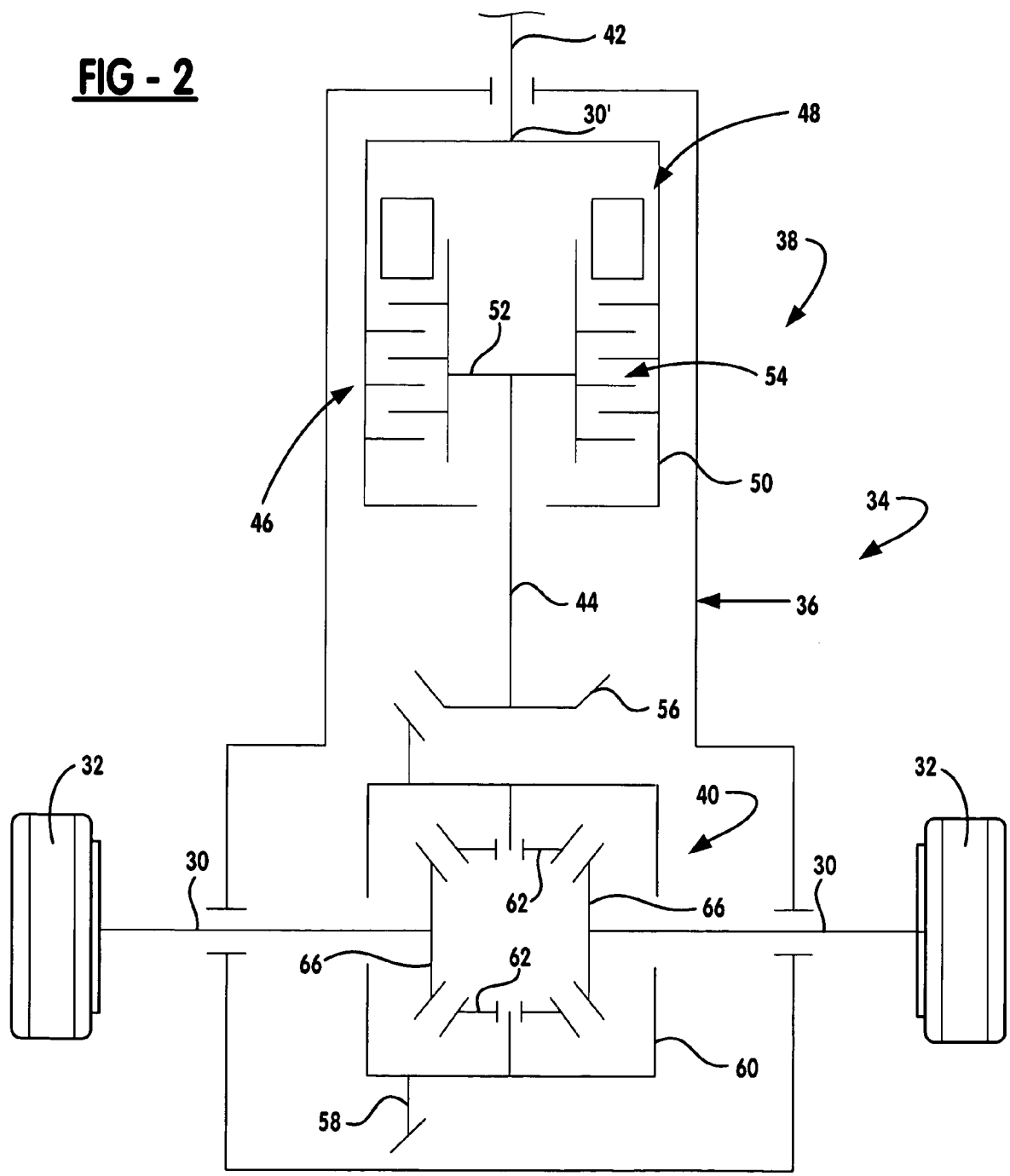
FIG. 2 is a schematic illustration of the power transmission device equipped with a hydraulic coupling embodying the inventive concepts of the present invention.

Referring now to FIG. 2, drive axle assembly 34 is schematically shown to define a power transmission device according to one preferred embodiment of the present invention. In particular, drive axle assembly 34 is shown to include a housing assembly 36 which encloses a torque transmission unit 38 and a differential unit 40. Torque transmission unit 38 functions to selectively transfer drive torque from propshaft 28 to an input component of differential unit 40. Specifically, torque transmission unit, hereinafter referred to as hydraulic coupling 38, includes an input shaft 42 driven by propshaft 28, an output shaft 44, a transfer clutch 46 operably connected between input shaft 42 and output shaft 44, and a hydramechanical clutch actuator 48 operable for generating and applying a compressive clutch engagement force on transfer clutch 46 in response to, and as a function of, the speed difference between input shaft 42 and output shaft 44.

Transfer clutch 46 generally includes a first member 50 driven by input shaft 42, a second member 52 driving output shaft 44, and a multi-plate clutch pack 54 of alternately interleaved clutch plates installed between input shaft 42 and pinion shaft 44. As shown in this particular arrangement, first member 50 is a clutch drum and second member 52 is a clutch hub. Output shaft 44 is a pinion shaft having a pinion gear 56 meshed with a ring gear 58 which, in turn, drives differential unit 40. Differential unit 40 includes a differential case 60 driven by ring gear 58, a pair of pinion gears 62 rotatably supported on pinion posts 64 fixed to case 60, and a pair of side gears 66. Each side gear 66 is meshed with both pinion gears 64 and is coupled for rotation with a corresponding one of axleshafts 30.

Figure 3:
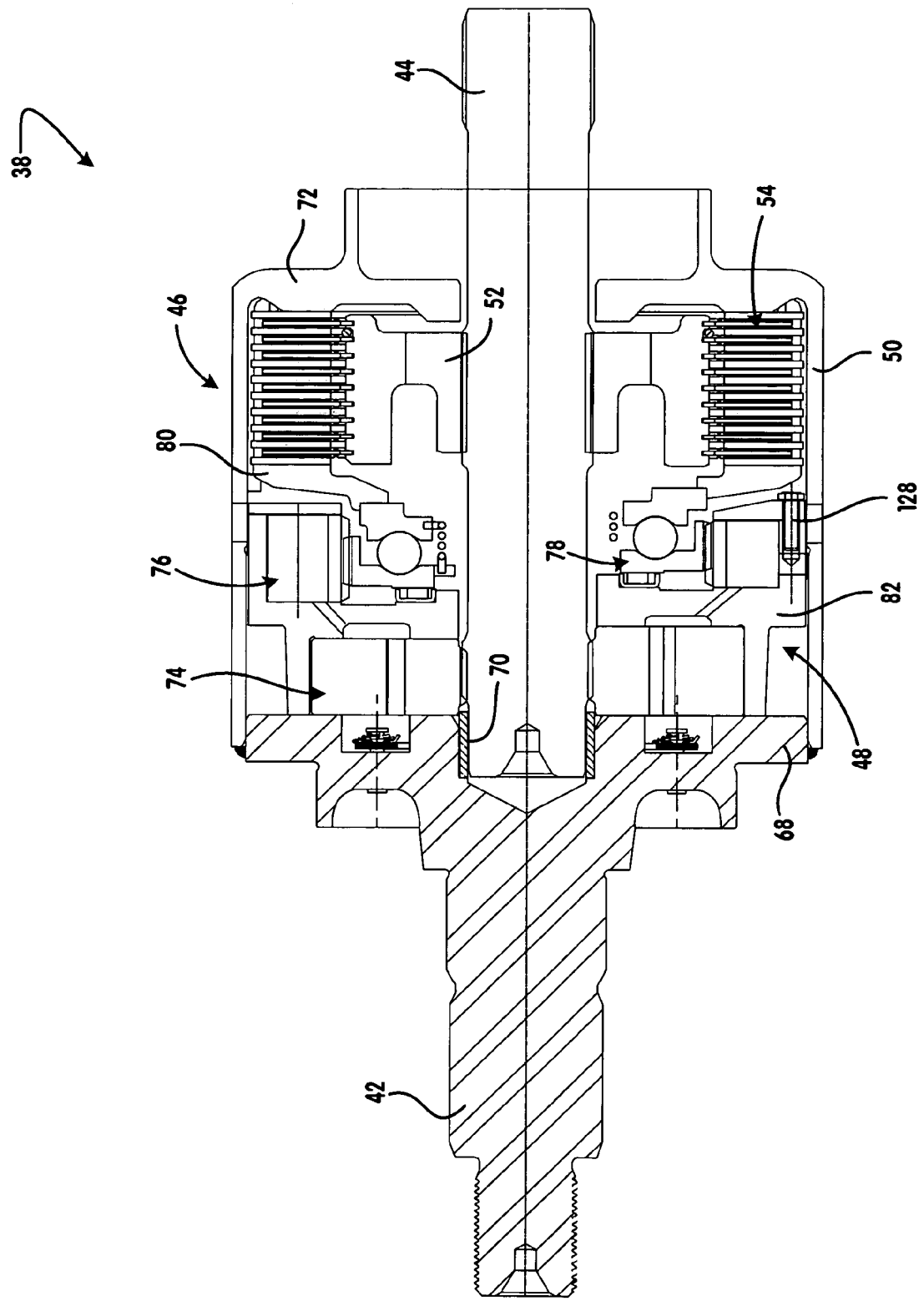
FIGS. 3 and 3A are sectional views of the hydraulic coupling constructed in accordance with a preferred embodiment of the present invention.
Figure 3A:
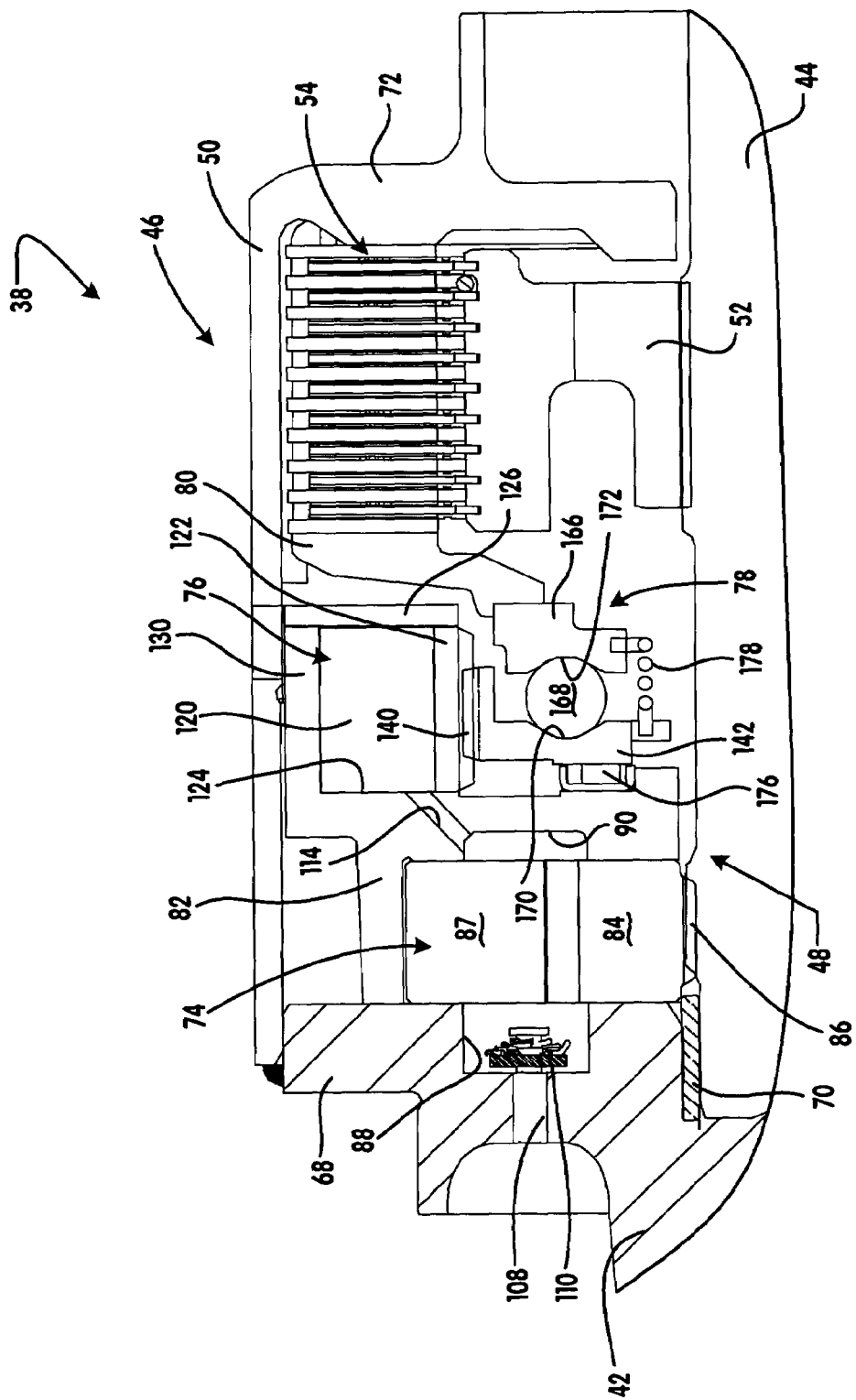

Referring now to FIGS. 3 and 3A, a preferred construction for hydraulic coupling 38 will now be described in greater detail. Input shaft 42 is shown to include an integral end plate 68 that is rigidly secured (i.e., welded) to clutch drum 50. Output pinion shaft 44 has a first end rotatably supported by a bushing or bearing assembly 70 in a central bore formed in end plate 68 while its second end extends out of an end plate segment 72 of drum 50. Clutch actuator 48 generally includes a fluid pump 74, a rotary operator 76, a ball ramp unit 78, and an apply plate 80. Apply plate 80 is secured (i.e., splined) for rotation with drum 50 of transfer clutch 46. Fluid pump 72 is disposed in a pump chamber formed between end plate 68 and a pump housing 82 that is also secured for rotation with drum 50. Pump 72 is preferably a gerotor pump having a first pump component 84 fixed via a spline connection 86 for rotation with pinion shaft 44 and a second pump component 87 supported for rotation with input shaft 42. A pair of inlet channels 88 formed in end plate 68 permit fluid to be supplied to the low pressure inlet side of pump 74 while a pair of outlet channels 90 formed in pump housing 82 permit pressurized fluid to be supplied from the high pressure outlet side of pump 74 to rotary operator 76. As noted, the fluid pressure is generated in response to relative rotation between the two pump components of pump 74 and is largely a function of the rotary speed difference between input shaft 42 and pinion shaft 44.

Figure 5:
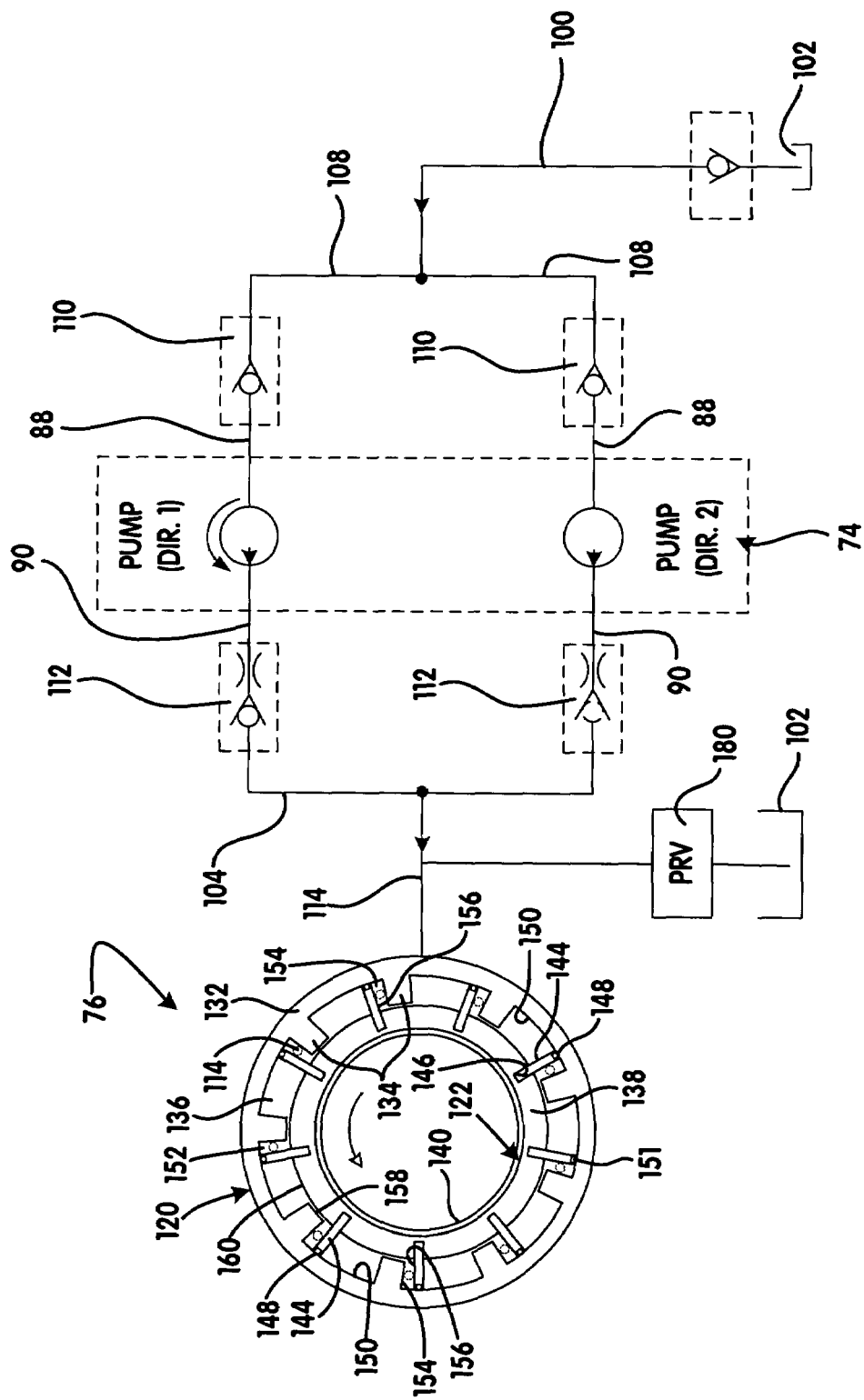
FIG. 5 is a schematic diagram of the hydraulic circuit associated with the hydraulic coupling of the present invention.

FIG. 5 discloses a schematic illustration of the fluid distribution and valving arrangement associated with hydraulic coupling 38. This arrangement includes a first flow path 100 for supplying hydraulic fluid from a sump 102 within housing 36 to inlet channels 88, and a second flow path 104 for supplying fluid from outlet channels 90 to a plurality of actuation chambers 106 associated with rotary operator 76. First flow path 100 is defined by a pair of inlet ports 108 formed through end plate 68 which are in fluid communication with the fluid in sump 102. A one-way check valve 110 is provided for selectively opening and closing each of inlet ports 108 in response to the direction of pumping action generated by fluid pump 74. Relative rotation between the pump components in a first direction acts to open one check valve 110 and close the other for permitting fluid to be drawn from sump 102 through one of inlet ports 108 into its corresponding inlet channel 88. The opposite action occurs in response to relative rotation of the pump components in the opposite direction. Check valves 110 are of the normally-closed type so as to maintain a fluid supply within inlet channels 88.

The valving arrangement associated with second flow path 104 includes a second pair of one-way check valves 112 that are located between outlet channels 90 and radial actuation ports 114 formed through pump housing 82. Again, the direction of pumping action establishes which of check valves 112 is in its open position and which is in its closed position. Upon cessation of the pumping action, both check valves 112 return to their closed positions so as to maintain fluid pressure in actuation ports 114. As such, check valves 112 are of the normally-closed variety.

As noted, pump 74 is operable for pumping fluid from sump 100 into actuation ports 114 for actuating rotary operator 76. Fluid pump 74 is bi-directional and is capable of pumping fluid at a rate proportional to the speed differential between its pump components. It will be understood that pump 74 can be any type of mechanical pump capable of generating a pumping action due to a speed differential.

Figure 4:
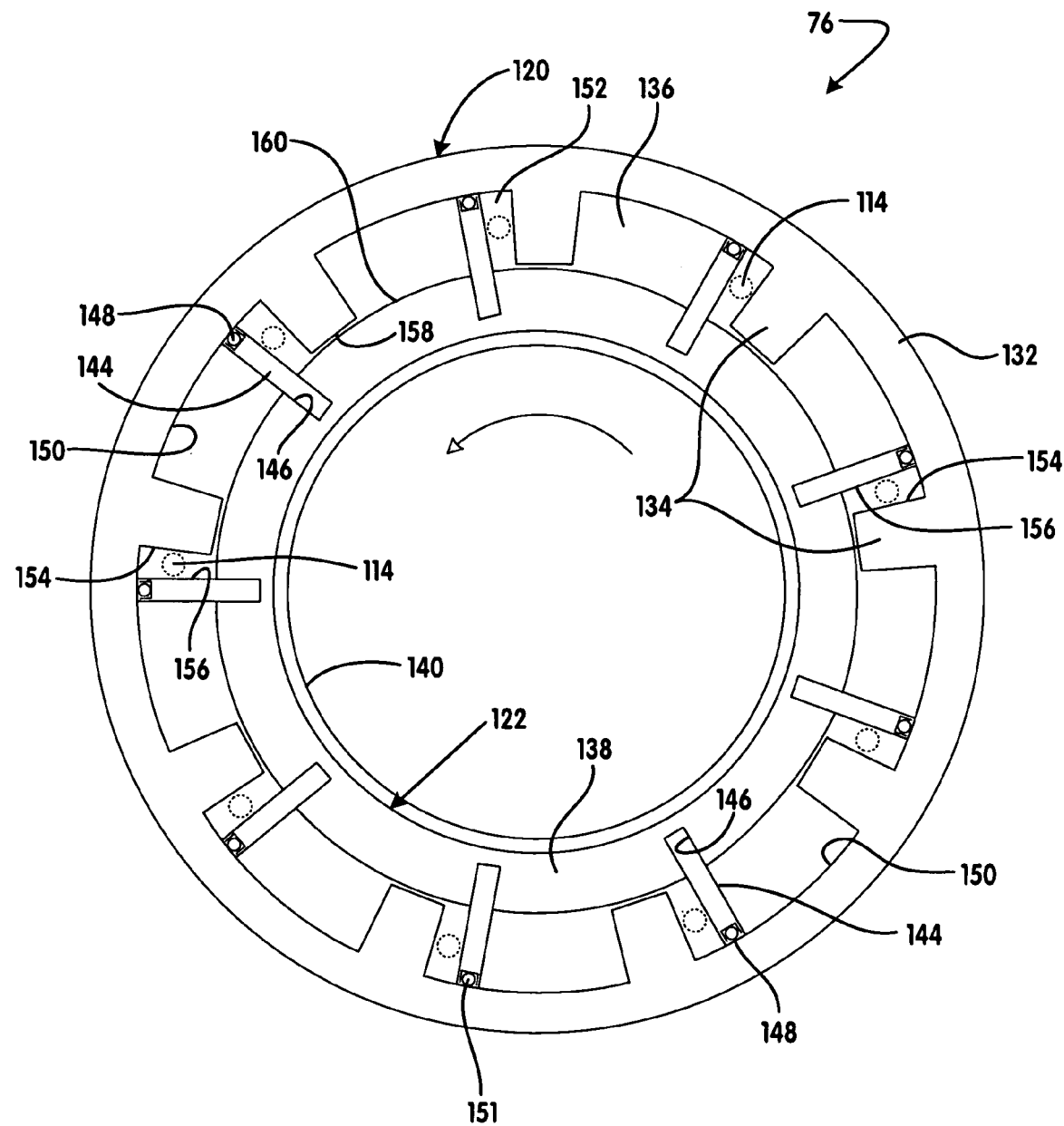
FIG. 4 is a sectional view of the rotary operator mechanism associated with the hydramechanical clutch actuator shown in FIGS. 3 and 3A.

Referring primarily to FIGS. 3A and 4, rotary operator 76 is shown to include a first or "reaction" ring 120 that is concentrically oriented relative to a second or "actuator" ring 122. The rings are retained in an operator chamber 124 defined between pump housing 82 and a retainer plate 126. As seen, retainer plate 126 is secured, such as by bolts 128, to an outer rim segment 130 of pump housing 82. Reaction ring 120 is adapted to rotate with pump housing 82 and includes a cylindrical body segment 132 and a plurality of radially inwardly projecting lugs 134. As seen, lugs 134 define a complementary number of longitudinally extending channels 136 therebetween.

Actuator ring 122 has a cylindrical body segment 138 that is fixed via a spline connection 140 to a first cam member 142 of ball ramp unit 78. In addition, separator plates 144 are retained in slots 146 formed in body segment 138 of actuator ring 122 and have an outer edge surface 148 aligned to be in sliding engagement with an inner surface 150 of channels 136. It is contemplated that a seal strip 151 may be attached to edge surface 148 to provide a sealed interface with inner surface 150. Actuation ports 114 (shown in phantom) communicate with actuation chambers 152 that are delimited within channels 136 between a face surface 154 of each lug 134 and a face surface 156 of each separator plate 144. As seen, a terminal edge surface 158 of lugs 134 are in sliding engagement with an outer surface 160 of actuator ring 122. As will be detailed, an increase in the fluid pressure delivered to actuation chambers 152 causes actuator ring 122 to move in a first angular direction (i.e., counterclockwise) as indicated by the arrow) relative to reaction ring 120 for energizing ball ramp unit 78 which, in turn, causes corresponding translational movement of apply plate 80 relative to clutch pack 54.

With continued reference primarily to FIG. 3A, ball ramp unit 78 includes first cam member 142, a second cam member 166 secured to apply plate 80, and followers, such as balls 168. Each ball 168 is disposed in a cam channel defined between a cam track 170 formed in first cam member 142 and a corresponding cam track 172 formed in second cam member 166. Preferably, a plurality of cam channels are provided between first cam member 142 and second cam member 166 with cam tracks 170 and 172 configured as oblique sections of a helical torus. However, balls 168 and cam tracks 170 and 172 may be replaced with alternative components and/or ramp configurations that function to cause axial displacement of second cam member 166. In any arrangement, the load transferring components can not be self-locking or self-engaging so as to permit fine control of the translational movement of apply plate 80 (via second cam member 166) for precise control of the engagement characteristics (i.e., torque transfer) of transfer clutch 46. As seen, a thrust bearing 176 is located between pump housing 82 and first cam member 142.

Ball ramp unit 78 further includes a torsional return spring 178 that is operably disposed between cam members 142 and 166. Return spring 178 is normally operable to angularly bias cam members 142 and 166 to return to a "retracted" position for causing corresponding angular movement of actuator ring 122 relative to reaction ring 120 in a second angular direction (clockwise in FIG. 4) toward a first or "low pressure" position and translational movement of apply plate 80 toward a first or "released" position. With actuator ring 122 in its low pressure position (as shown in FIG. 4), ball ramp unit 78 is de-energized and apply plate 80 exerts a predetermined minimum clutch engagement force on clutch pack 54 for essentially releasing engagement of transfer clutch 46. Rotary operator 76 is provided with fluid leakage paths which permit fluid in actuation chambers 152 to leak out at a predetermined rate so as to permit the biasing force of return spring 178 to cause angular displacement of actuator ring 122 relative to reaction ring 120 toward its low pressure position.

In operation, the delivery of high pressure fluid to actuation chambers 152 from pump 74 causes actuator ring 122 to rotate relative to reaction ring 120 in the first direction from its low pressure position toward a second or "high pressure" position which, in turn, results in corresponding relative rotation between cam members 142 and 166 from the retracted position toward a second or "extended" position. In essence, such angular movement of actuator ring 122 acts to initiate energization of ball ramp unit 78. Accordingly, the profile of cam tracks 170 and 172 establishes the resultant amount of translational movement of second cam member 166 required to cause corresponding axial movement of apply plate 80 from its released position toward a second or "locked" position. A maximum clutch engagement force is exerted on clutch pack 54 for fully engaging transfer clutch 46 when apply plate 80 is located in its locked position.

With apply plate 80 in its released position, virtually no drive torque is transferred from input shaft 42 to pinion shaft 44 through hydraulic coupling 38 so as to effectively establish a two-wheel drive mode. In contrast, location of apply plate 80 in its locked position results in a predetermined maximum amount of drive torque being transferred to pinion shaft 44 for coupling pinion shaft 44 for common rotation with input shaft 42, thereby establishing a locked or part-time four-wheel drive mode. Accordingly, controlling the position of apply plate 80 between its released and locked positions permits variable control of the amount of drive torque transferred from input shaft 42 to pinion shaft 44 for establishing an on-demand four-wheel drive mode. Thus, the magnitude of the fluid pressure supplied to actuation chambers 152 controls the angular position of actuator ring 122 relative to reaction ring 120, thereby actuating ball ramp unit 78 for controlling movement of apply plate 80 between its released and locked positions.

A torque limiting feature is provided by rotary operator 76 which functions to limit the maximum fluid pressure supplied by pump 74 to actuation chambers 152, thereby limiting the clutch engagement force generated by ball ramp unit 78 and exerted by apply plate 80 on clutch pack 54. To this end, separator plates 144 are preferably made from a material capable of resiliently deflecting when exposed to a predetermined maximum fluid pressure within actuation chambers 152. In particular, the cantilevered mounting arrangement permits the terminal portion of each separator plate 144 to deflect under pressure to allow fluid to pass into channels 136 through the clearance established between terminal end surface 148 of separator plates 144 and surface 150 of reaction ring 120. As an option, separator plates 144 can be made rigid to prevent such resilient deflection while a pressure relief valve 180 (see FIG. 5) is provided to limit the maximum fluid pressure actually transmitted to actuation chamber 152.

Figure 6:
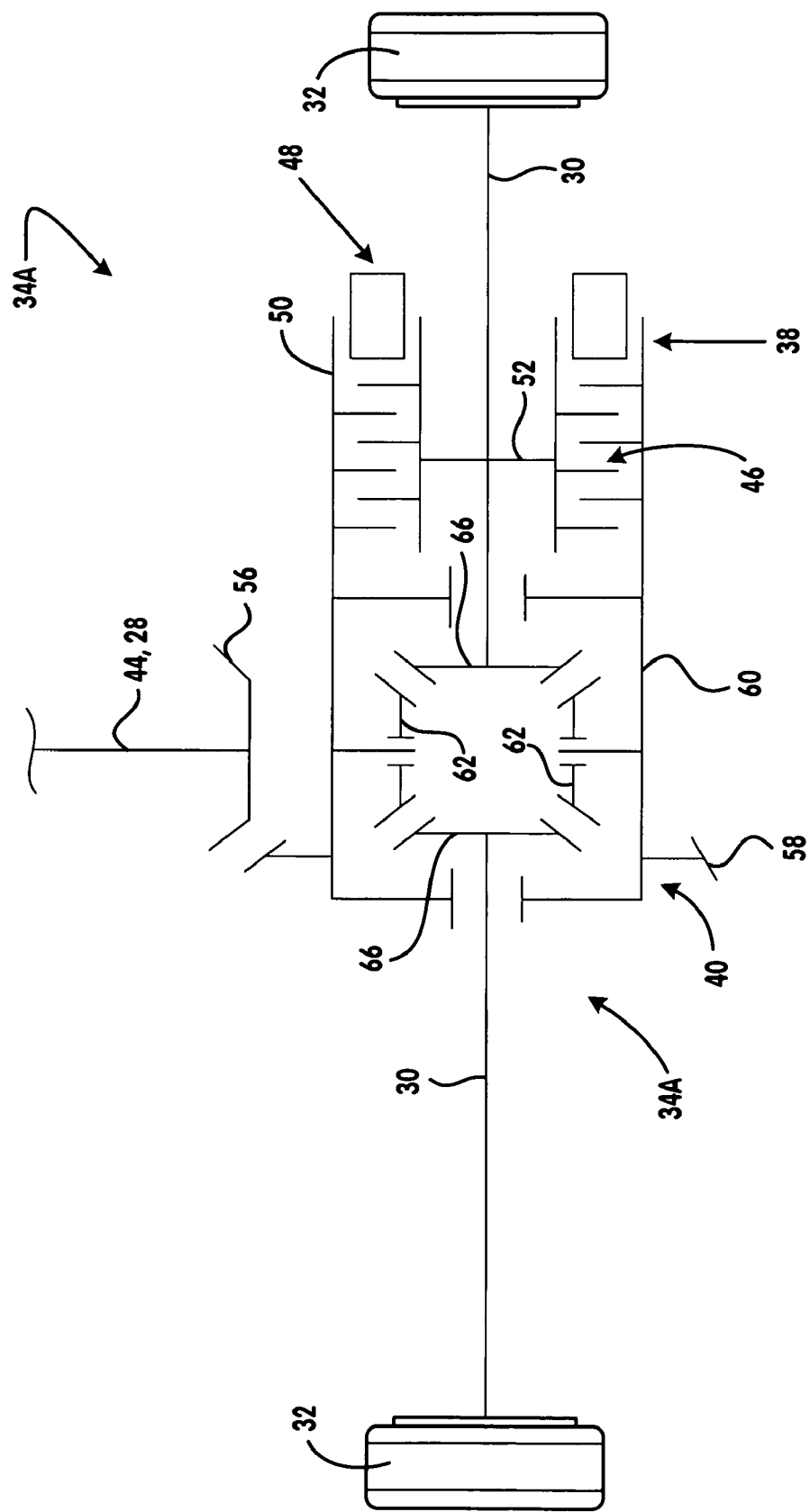
FIG. 6 is a schematic illustration of an alternative power transmission device available for use with the drivetrain shown in FIG. 1.

The arrangement shown for drive axle assembly 34 of FIG. 2 is operable to provide on-demand four-wheel drive by automatically transferring drive torque from primary driveline 14 (via propshaft 28) to secondary driveline (via pinion shaft 44) in response to and as a function of the occurrence of an interaxle speed difference between input shaft 42 and pinion shaft 44. In contrast, a drive axle assembly 34A is shown in FIG. 6 wherein a hydraulic coupling 38 is operably installed between differential case 60 and one of axleshafts 30 to provide an on-demand torque biasing and limited slip feature in response to the occurrence of an intra-axle speed difference. As before, hydraulic coupling 38 is schematically shown to include a transfer clutch 46 and a hydramechanical clutch actuator 48, the construction and function of which are understood to be similar to the detailed description previously provided herein for each sub-assembly. It will be understood that this particular "limited slip" differential arrangement can either be used in association with the on-demand drive axle assembly shown in FIG. 2 or in association with a drive axle assembly wherein propshaft 28 directly drives differential unit 40.

Figure 7:
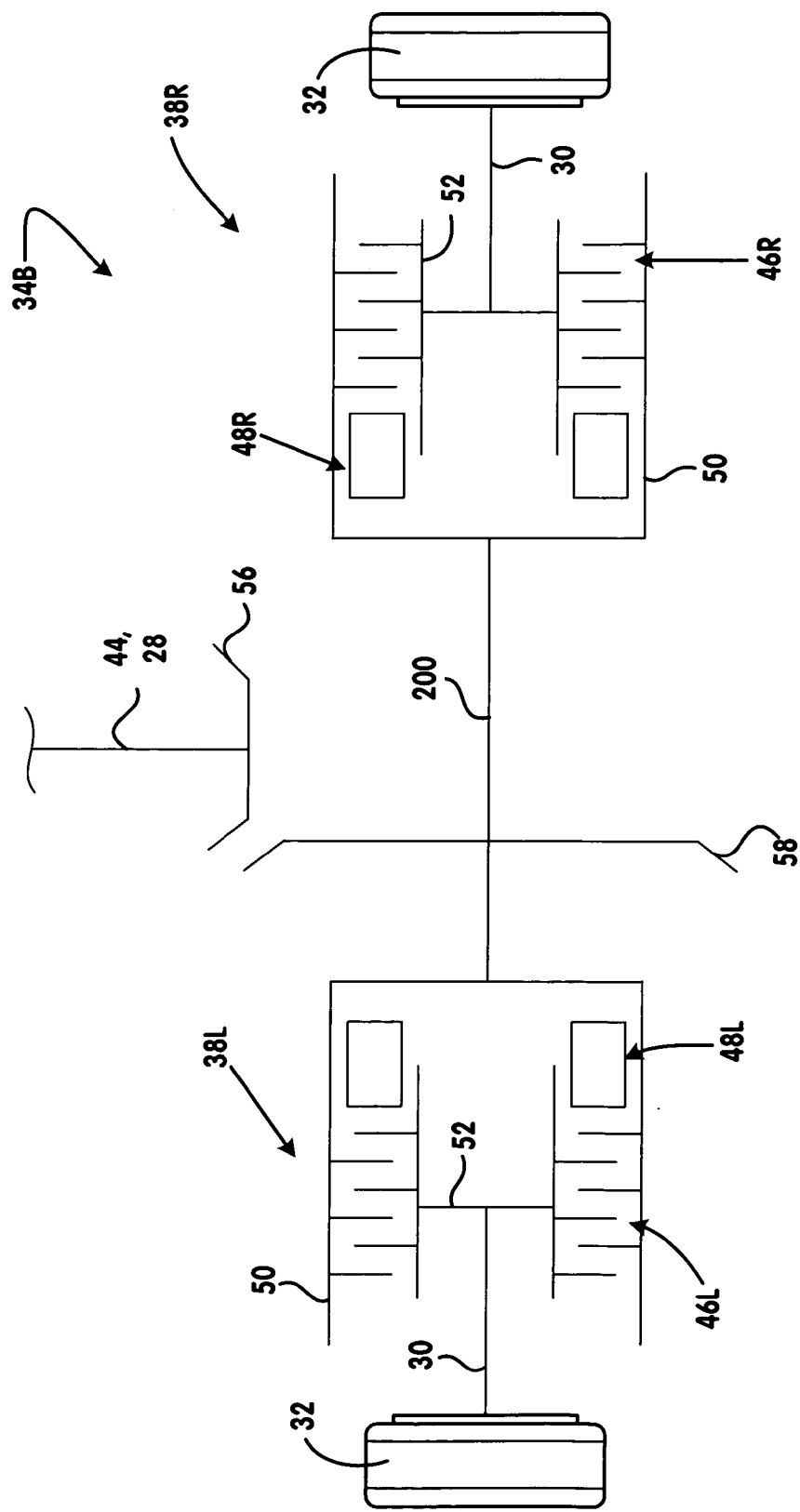
FIG. 7 is a schematic illustration of another alternative embodiment of a power transmission device according to the present invention.

Referring now to FIG. 7, a drive axle assembly 34B is schematically shown to include a pair of hydraulic couplings 38L and 38R operably installed between a driven pinion shaft 44 or 28 and axleshafts 30. Driven pinion shaft drives a right-angled gearset including a pinion 56 and a ring gear 58 which, in turn, drives a transfer shaft 200. First hydraulic coupling 38L is shown disposed between transfer shaft 200 and the left one of axleshafts 30 while second hydraulic coupling 38R is disposed between transfer shaft 200 and the right axle shaft 30. Each coupling includes a corresponding transfer clutch 46L, 46R and a hydramechanical clutch actuator 48L, 48R. Accordingly, independent slip control between the driven pinion shaft and each wheel 32 is provided by this arrangement.

Figure 8:
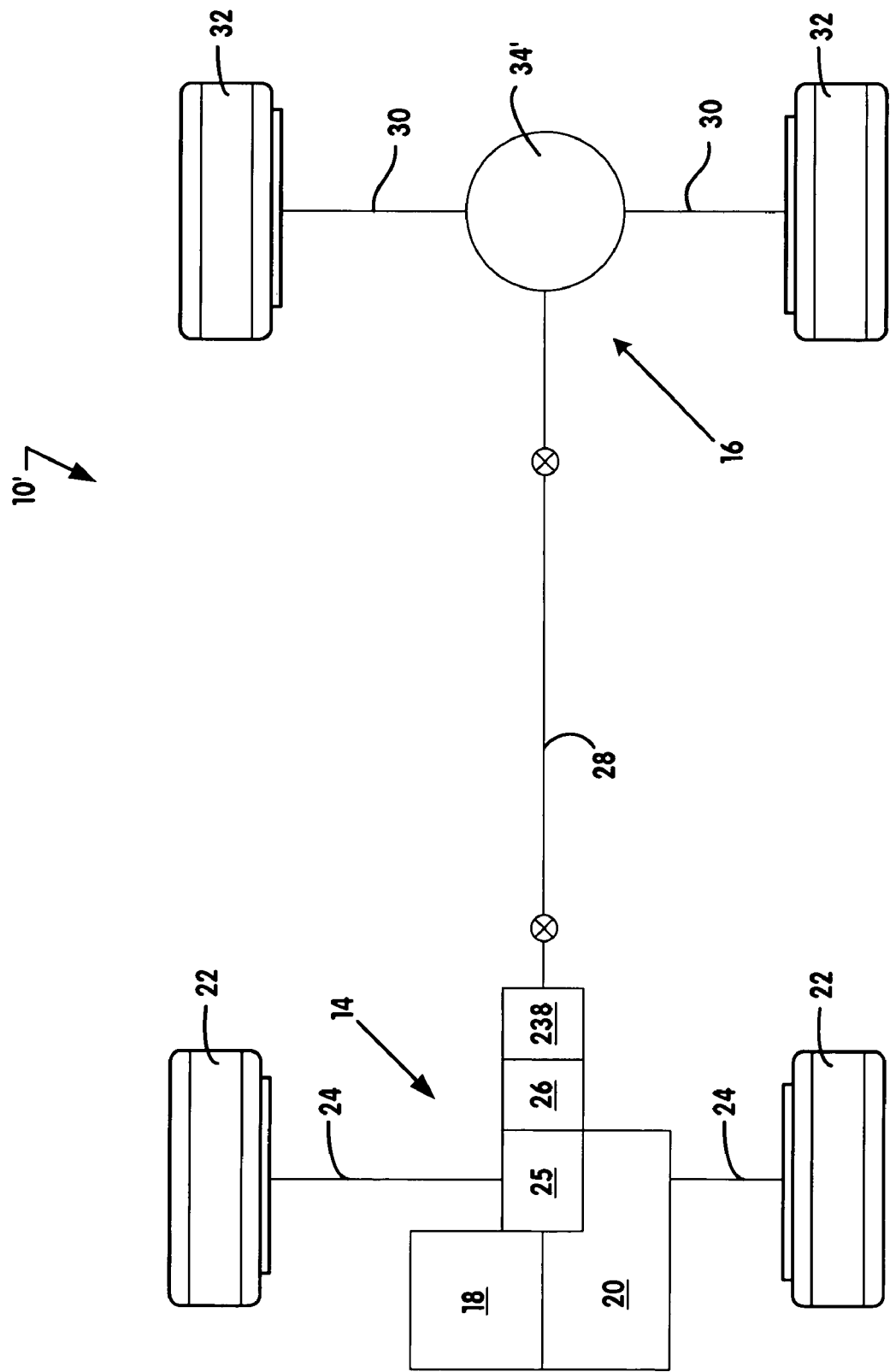
FIG. 8 illustrates an alternative drivetrain arrangement for a four-wheel drive motor vehicle equipped with another power transmission device embodying the present invention.

To illustrate an alternative power transmission device to which the present invention is applicable, FIG. 8 schematically depicts a front-wheel based four-wheel drive drivetrain layout 10' for a motor vehicle. In particular, engine 18 drives a multi-speed transaxle 20 having an integrated front differential unit 25 for driving front wheels 22 via axle shafts 24. As before, PTU 26 is also driven by transaxle 20 for delivering drive torque to the input member of a torque transmission unit 238. The output member of torque transmission unit 238 is coupled to propshaft 28 which, in turn, drives rear wheels 32 via axleshafts 30. Rear axle assembly 34' can be a traditional driven axle with a differential or, in the alternative, be similar to the arrangements described in regard to FIG. 6 or 7. Accordingly, in response to the occurrence of a front wheel slip condition, torque transmission unit 238 delivers drive torque "on-demand" to rear wheels 32. It is contemplated that torque transmission unit 238 would be generally similar in structure and function to that of torque transmission unit 38 previously described herein. As such, its primary components of a transfer clutch 46 and a hydramechanical clutch actuator 48 are schematically shown.

Figure 9:
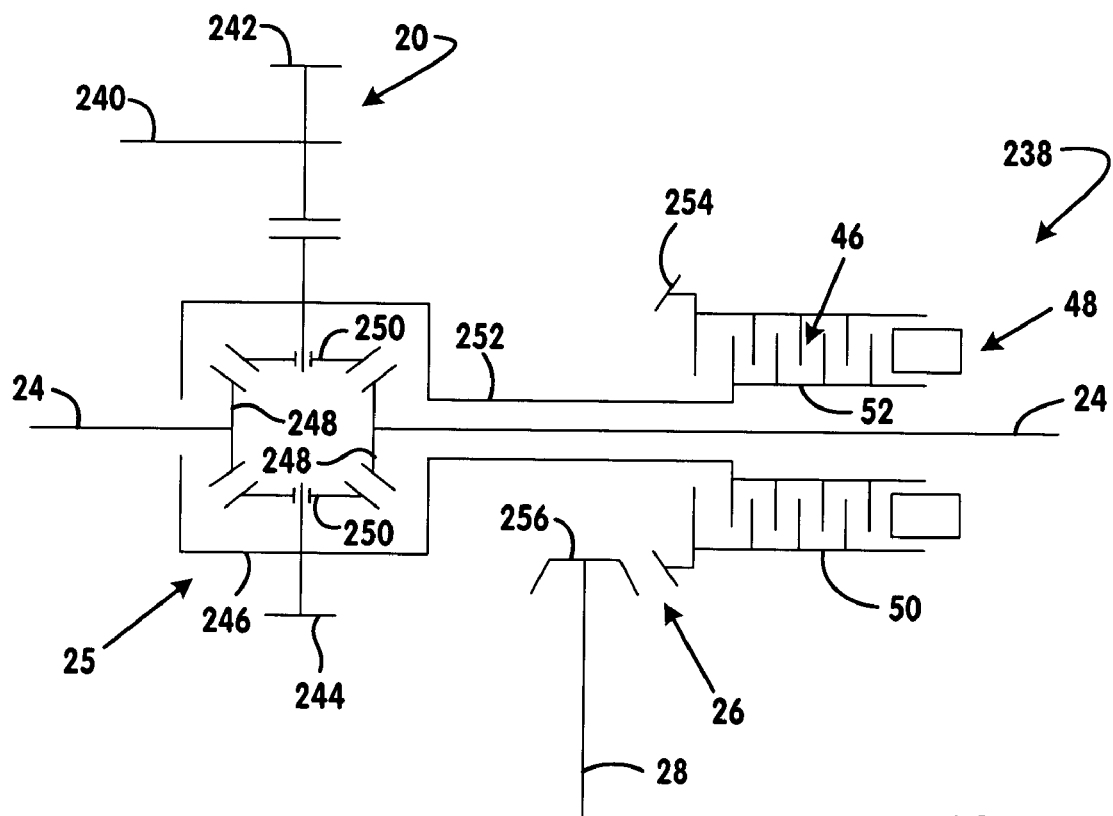
FIG. 9 through 12 schematically illustrate different embodiments of the power transmission device shown in FIG. 8.

Referring now to FIG. 9, torque coupling 238 is schematically illustrated in association with an on-demand four-wheel drive system based on a front-wheel drive vehicle similar to that shown in FIG. 8. In particular, an output shaft 240 of transaxle 20 is shown to drive an output gear 242 which, in turn, drives an input gear 244 that is fixed to a carrier 246 associated with front differential unit 25. To provide drive torque to front wheels 22, front differential unit 25 includes a pair of side gears 248 that are connected to front wheels 22 via axleshafts 24. Differential unit 25 also includes pinions 250 that are rotatably supported on pinion shafts fixed to carrier 246 and which are meshed with side gears 348. A transfer shaft 252 is provided for transferring drive torque from carrier 246 to a clutch hub 52 associated with transfer clutch 46. PTU 26 is a right-angled drive mechanism including a ring gear 324 fixed for rotation with drum 50 of transfer clutch 46 and which is meshed with a pinion gear 256 fixed for rotation with propshaft 28. According to the present invention, the components schematically shown for torque transfer mechanism 238 are understood to be similar to those previously described. In operation, drive torque is transferred on-demand from the primary (i.e., front) driveline to the secondary (i.e., rear) driveline.

Figure 10:
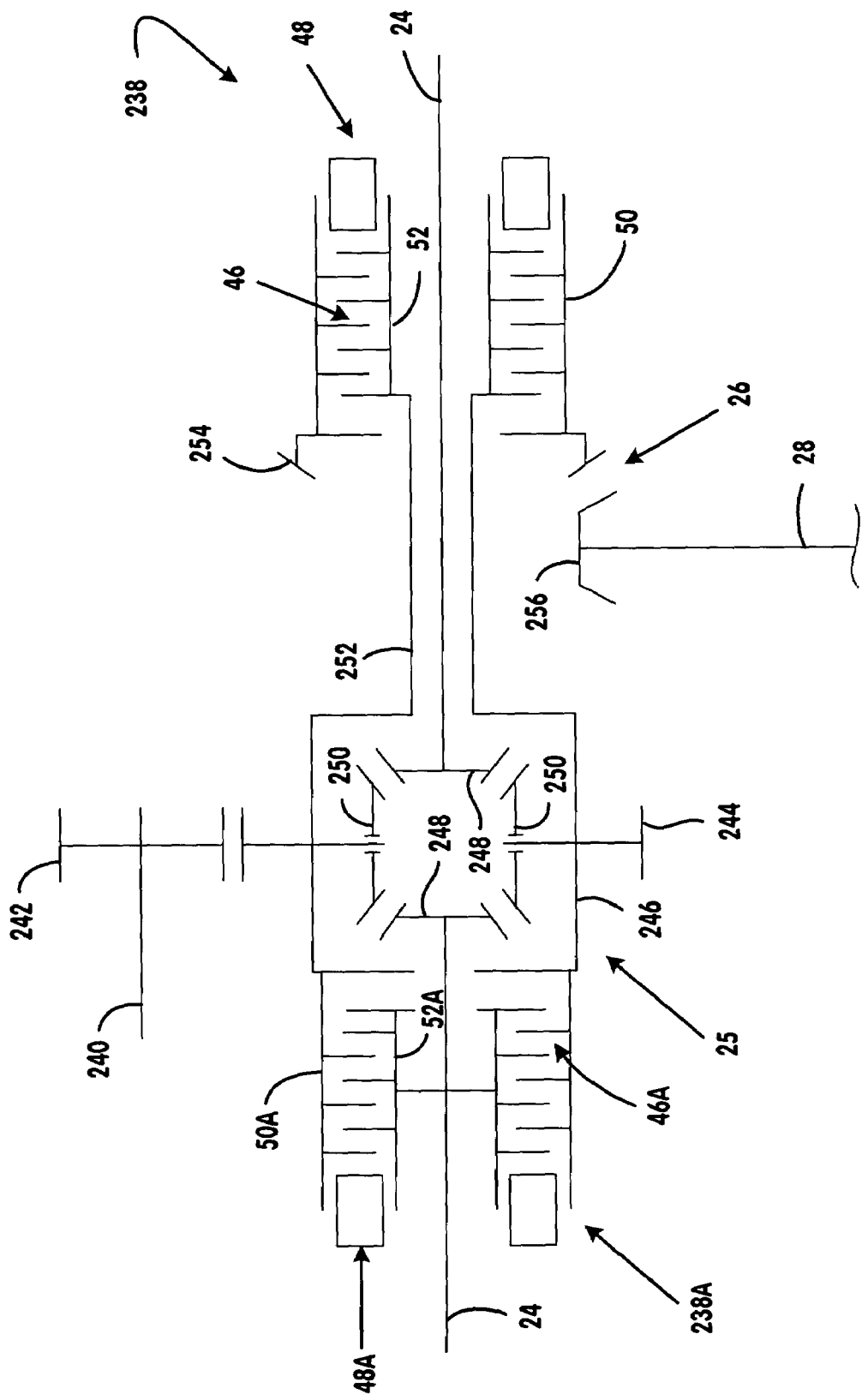

Referring to FIG. 10, a modified version of the power transmission device shown in FIG. 9 now includes a second hydraulic coupling 238A that is arranged to provide a limited slip feature in association with primary differential 25. As before, hydraulic coupling 238 provides on-demand transfer of drive torque from the primary driveline to the secondary driveline. In addition, second hydraulic coupling 238A now provides on-demand torque biasing (side-to-side) between axleshafts 24 of primary driveline 14.

Figure 11:
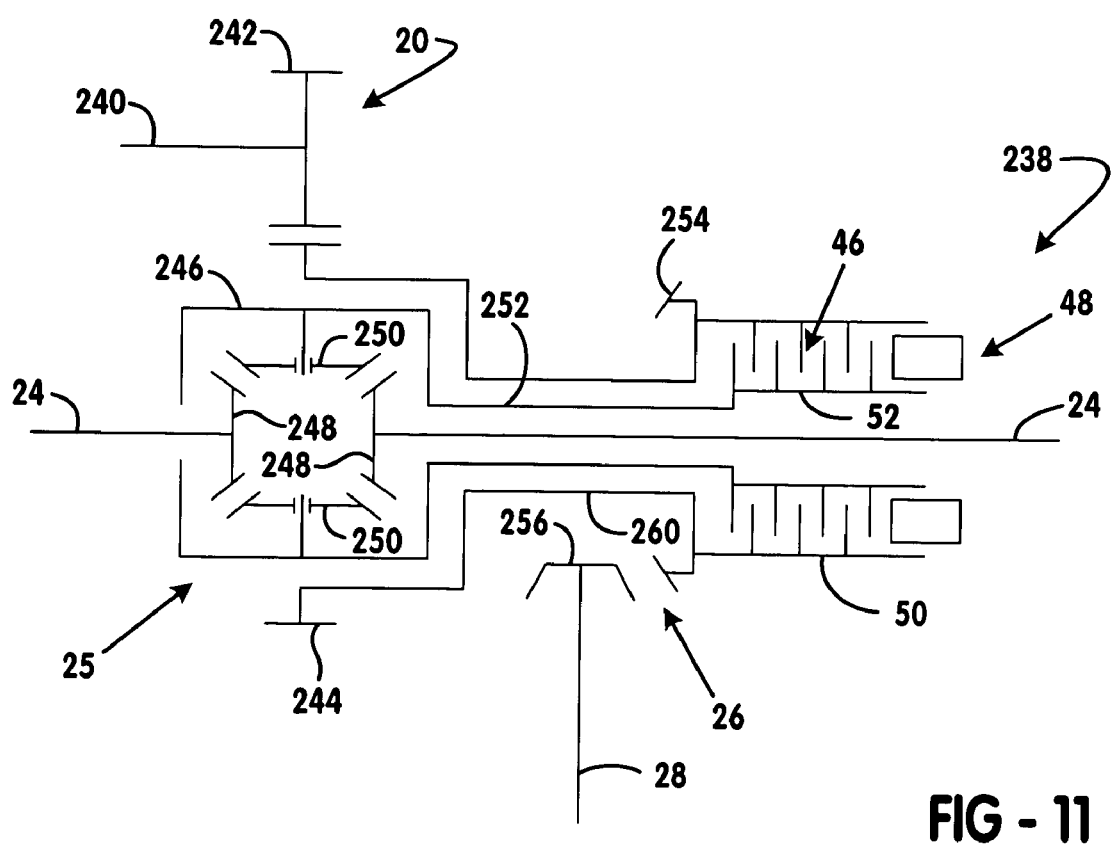

FIG. 11 illustrates another modified version of FIG. 9 wherein an on-demand four-wheel drive system is shown based on a rear-wheel drive motor vehicle that is arranged to normally deliver drive torque to rear wheels 32 while selectively transmitting drive torque to front wheels 22 through a torque coupling 238. In this arrangement, drive torque is transmitted directly from transmission output shaft 240 to power transfer unit 26 via a drive shaft 260 which interconnects input gear 244 to ring gear 254. To provide drive torque to front wheels 22, torque coupling 238 is shown operably disposed between drive shaft 260 and transfer shaft 252. In particular, transfer clutch 46 is arranged such that drum 50 is driven with ring gear 254 by drive shaft 260. As such, clutch actuator 48 functions to transfer drive torque from drum 50 through the clutch pack to hub 52 which, in turn, drives carrier 246 of differential unit 25 via transfer shaft 252.

Figure 12:
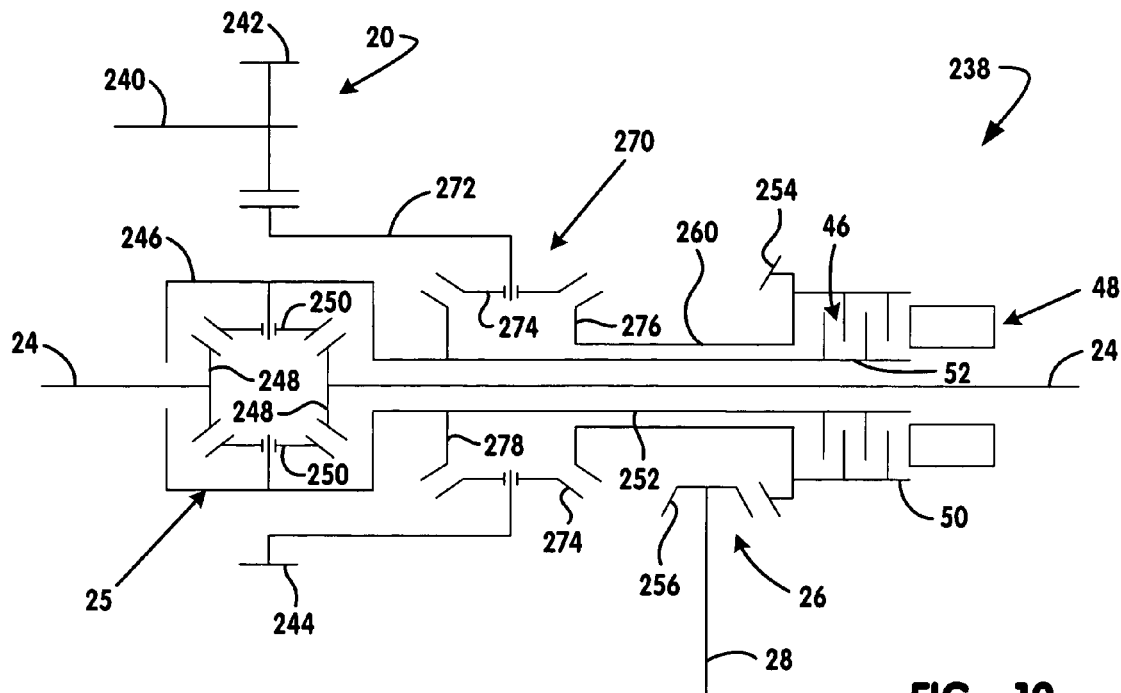

In addition to the on-demand four-wheel drive systems shown previously, the power transmission technology of the present invention can likewise be used in full-time four-wheel drive systems to adaptively bias the torque distribution transmitted by a center or "interaxle" differential unit to the front and rear drivelines. For example, FIG. 12 schematically illustrates a full-time four-wheel drive system which is generally similar to the on-demand four-wheel drive system shown in FIG. 11 with the exception that an interaxle differential unit 270 is now operably installed between carrier 246 of front differential unit 25 and transfer shaft 252. In particular, output gear 244 is fixed for rotation with a carrier 272 of interaxle differential 270 from which pinion gears 274 are rotatably supported. A first side gear 276 is meshed with pinion gears 274 and is fixed for rotation with drive shaft 260 so as to be drivingly interconnected to the rear driveline through power transfer unit 26. Likewise, a second side gear 278 is meshed with pinion gears 274 and is fixed for rotation with carrier 246 of front differential unit 25 so as to be drivingly interconnected to the front driveline. Torque transfer mechanism 238 is now shown to be operably disposed between side gears 276 and 278. Torque transfer mechanism 238 is operably arranged between the driven outputs of interaxle differential 270 for providing an adaptive torque biasing and slip limiting function.

Figure 13:
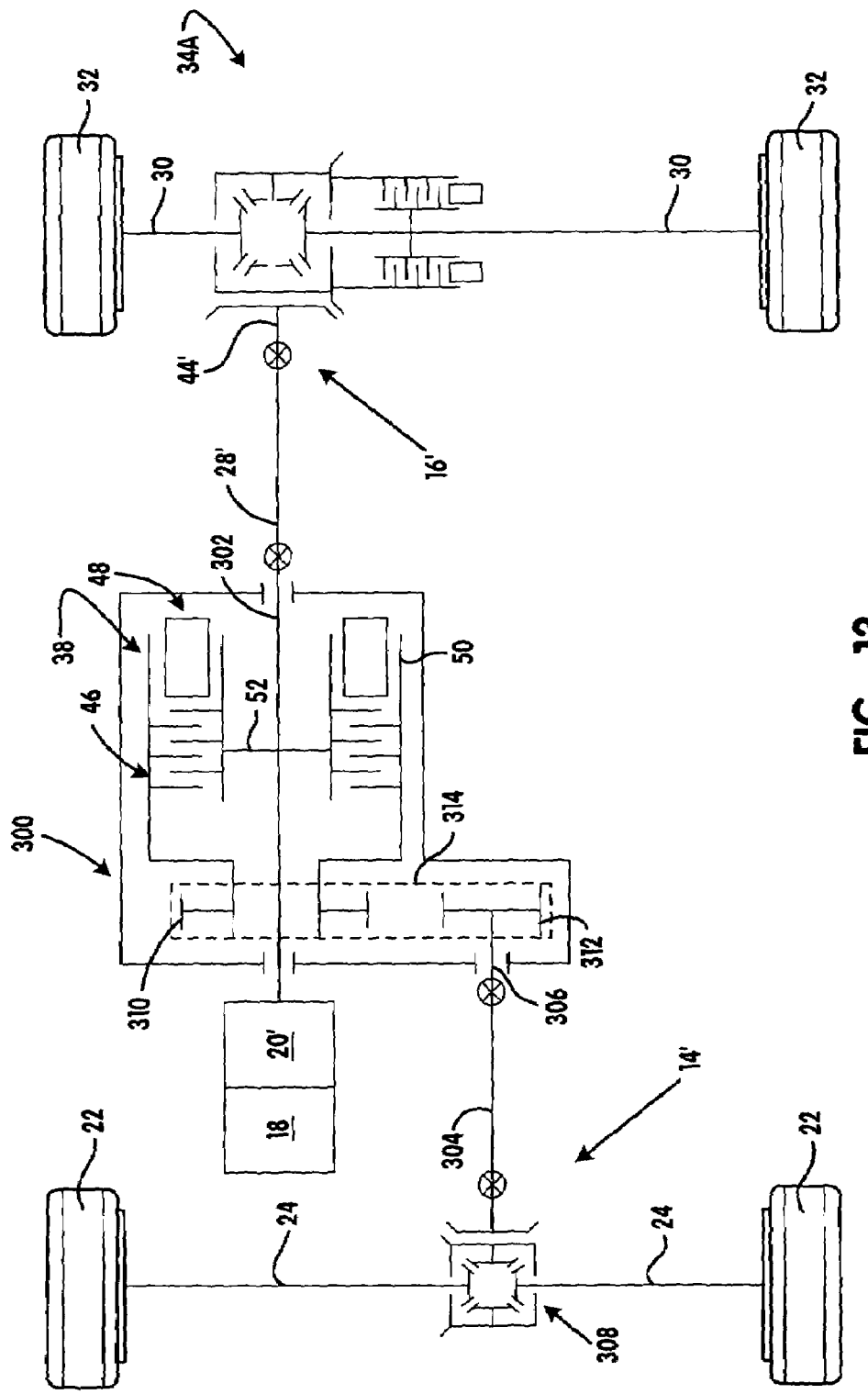
FIG. 13 is an illustration of another drivetrain arrangement for a four-wheel drive vehicle equipped with a power transmission device embodying the present invention.

Referring now to FIG. 13, a drivetrain for a four-wheel drive vehicle is shown to include engine 18, a multi-speed transmission 20' for delivering drive torque to a primary or rear driveline 16' through a power transmission device, thereinafter referred to as transfer case 300. As seen, transfer case 300 has a rear output shaft 302 interconnected between the output of transmission 20' and a rear propshaft 28'. Further, propshaft 28' is shown to drive a pinion shaft 44' for driving rear axle assembly 34A of FIG. 6. A secondary or front driveline 14' includes a front propshaft 304 interconnecting a front output shaft 306 of transfer case 300 to a conventional front axle assembly 308. A transfer assembly associated with transfer case 300 includes a first sprocket 310 rotatably supported on rear output shaft 302, a second sprocket 312 fixed to front output shaft 306, and a chain 314 enmeshed therebetween. Transfer case 300 is shown to include a hydraulic coupling 38 for providing on-demand transfer of drive torque from rear output shaft 302 through the transfer assembly to first output shaft 306.

Figure 14:
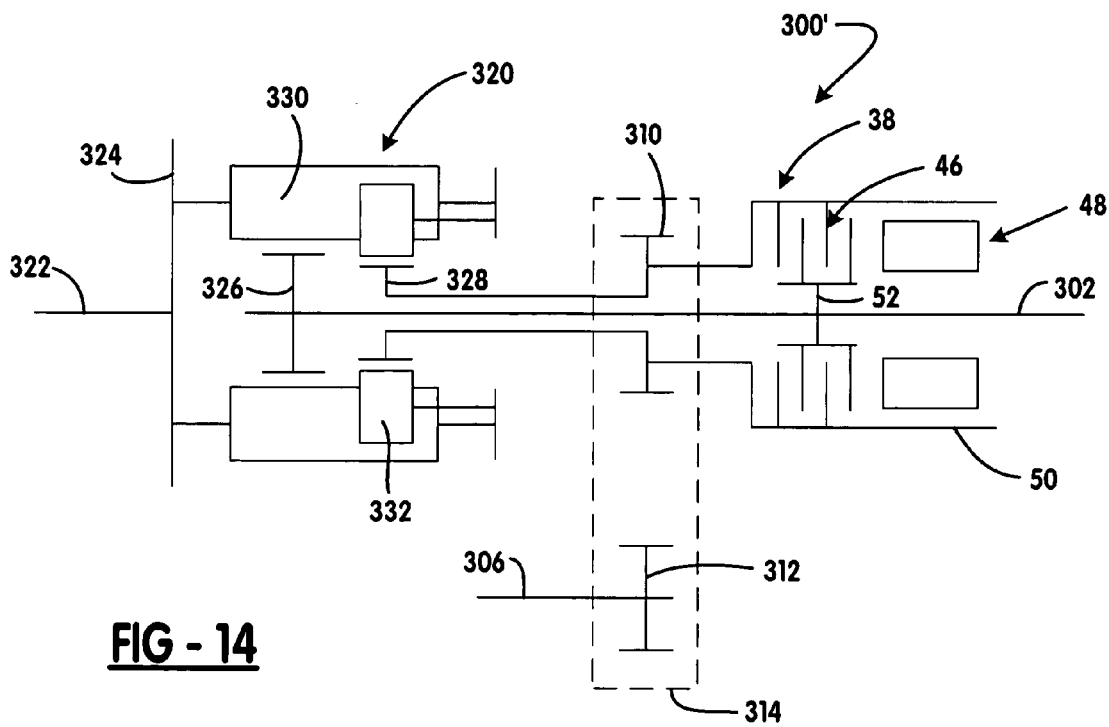
FIG. 14 is a schematic illustration of an alternative construction for the power transmission device shown in FIG. 13.

Referring now to FIG. 14, a full-time 4WD system is shown to include a transfer case 300' which is generally similar to transfer case 300 of FIG. 13 except that an interaxle differential 320 is provided between an input shaft 322 and output shafts 302 and 306. As is conventional, input shaft 322 is driven by the output of transmission 20'. Differential 320 includes an input defined as a planet carrier 324, a first output defined as a first sun gear 326, a second output defined as a second sun gear 328, and a gearset for permitting speed differentiation between first and second sun gears 326 and 328. The gearset includes a plurality of meshed pairs of first planet gears 330 and second pinions 332 which are rotatably supported by carrier 324. First planet gears 330 are shown to mesh with first sun gear 326 while second planet gears 332 are meshed with second sun gear 328. First sun gear 326 is fixed for rotation with rear output shaft 302 so as to transmit drive torque to rear driveline 16'. To transmit drive torque to front driveline 14', second sun gear 328 is coupled to the transfer assembly which again includes first sprocket 310 rotatably supported on rear output shaft 302, second sprocket 312 fixed to front output shaft 306, and power chain 314.

A number of preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A power transmission device comprising:
   a rotary input member adapted to receive drive torque from a source of drive torque;
   a rotary output member adapted to transmit drive torque to an output device; and
   a torque transmission unit operable for transferring drive torque from said input member to said output member, said torque transmission unit including a friction clutch operably disposed between said input member and said output member and a clutch actuator for controlling engagement of said friction clutch, said clutch actuator including a fluid pump, a rotary operator and a thrust mechanism, said fluid pump is operable for generating fluid pressure in proportion to the magnitude of a rotary speed differential between said input and output members, said rotary operator including first and second components defining an actuation chamber therebetween that is adapted to receive the fluid pressure generated by said pump, said first component being fixed for rotation with one of said input and output members and said second component adapted to rotate relative to said first component in response to the fluid pressure in said actuation chamber, and said thrust mechanism is operable for applying a clutch engagement force on said friction clutch in response to rotation of said second component relative to said first component.

2. The power transmission device of claim 1 wherein movement of said second component to a low pressure position relative to said first component causes said thrust mechanism to be located in a first position for applying a minimum clutch engagement force on said friction clutch, and wherein movement of said second component to a high pressure position relative to said first component causes said thrust mechanism to move to a second position for applying a maximum clutch engagement for on said friction clutch.

3. The power transmission device of claim 2 wherein said torque transmission unit further includes a biasing mechanism for biasing said thrust mechanism toward its first position which, in turn, biases said second component of said rotary operator toward its low pressure position.

4. The power transmission device of claim 2 wherein movement of said second component from its low pressure position toward its high pressure position is caused by an increase in the fluid pressure delivered by said fluid pump to said actuation chamber in response to an increase in the rotary speed differential between said input and output members.

5. The power transmission device of claim 2 wherein said torque transmission unit further comprises:
   a pump housing fixed for rotation with said input member and defining a pump chamber, said fluid pump is retained in said pump housing and has a first pump member rotatable with said input member and a second pump member driven with said pump housing; and
   a fluid circuit including a first flow path for supplying fluid from a sump to an inlet of said fluid pump and a second flow path for supplying fluid from an outlet of said fluid pump to said actuator chamber.

6. The power transmission device of claim 5 wherein said second flow path includes a pressure relief valve operable to limit the fluid pressure delivered to said actuator chamber.

7. The power transmission device of claim 5 wherein said second flow path includes a check valve for maintaining fluid pressure in said actuation chamber.

8. The power transmission device of claim 5 wherein said pump housing defines an operator chamber with said rotary operator disposed in said operator chamber, said first component of said rotary operator is fixed to said pump housing for rotation with said input member and said second component is coaxially aligned with said first component so as to define said actuation chamber therebetween.

9. The power transmission device of claim 8 wherein said first component of said rotary operator is a reaction ring having a cylindrical body segment and plurality of inwardly projecting lugs so as to define a plurality of channels therebetween, and wherein said second component of said rotary actuator is an actuator ring having a cylindrical body segment and outwardly projecting separators which extend into said channels so as to define a series of actuation channels between adjacent pairs of lugs and separators.

10. The power transmission device of claim 2 wherein said first component of said rotary operator is a reaction ring having a cylindrical body segment and a plurality of radially inwardly extending lugs which define a series of channels therebetween, and wherein said second component is an actuator ring having a cylindrical body segment and a plurality of radially outwardly extending separators which extend into said channels so as to define a plurality of said actuation chambers between said lugs and separators, said actuator chambers are in fluid communication with an outlet of said fluid pump, and wherein said fluid pump is operable to draw low pressure fluid from a sump and deliver high pressure fluid to said actuation chambers for controlling rotary movement of said actuator ring relative to said reaction ring.

11. The power transmission device of claim 10 wherein said actuator ring is fixed to a drive component of said thrust mechanism such that rotation of said drive component results in translational movement of a driven component of said thrust mechanism for controlling the magnitude of said clutch engagement force applied to said friction clutch.

12. The power transmission device of claim 11 wherein said thrust mechanism is a ball ramp unit with a first cam plate as its drive component, a second cam plate as its driven components, and rollers retained in cam tracks formed between said first and second cam plates, said cam tracks configured to cause translational movement of said second cam plate in response to rotary movement of said first cam plate, and wherein said second cam plate is arranged to cause corresponding movement of an apply plate relative to said friction clutch.

13. The power transmission device of claim 12 wherein an increase in fluid pressure in said actuation chambers causes said actuator ring and said first cam plate to rotate in a first direction relative to said reaction ring for causing movement of said second cam plate from a first position toward a second position for axially moving said apply plate from a released position toward a locked position relative to said friction clutch.

14. The power transmission device of claim 13 wherein a decrease in fluid pressure in said actuation chambers causes said actuator ring and said first cam plate to rotate in a second direction relative to said reaction ring for causing movement between said second cam plate toward its first position for axially moving said apply plate toward its released position.

15. The power transmission device of claim 14 wherein said torque transmission unit further includes a biasing mechanism for normally biasing said actuator ring for rotation in its second direction relative to said reaction ring.

16. The power transmission device of claim 15 wherein a leakage flow path is provided in said actuator chambers to permit fluid therein to return to said sump so as to accommodate movement of said actuator ring in its second direction relative to said reaction ring.

17. The power transmission device of claim 1 wherein said input member is a first shaft in a transfer case and said output member is a second shaft of said transfer case.

18. The power transmission device of claim 1 wherein said input member is driven by a powertrain of a motor vehicle and said output member is connected to a differential unit of a drive axle assembly.

19. The power transmission device of claim 1 defining a drive axle assembly having a differential unit interconnecting a pair of axleshafts, and wherein said input member is a differential case of said differential unit, said output member is one of said axleshafts, and said torque transmission unit is arranged to limit slip in response to speed differentials between said axleshafts.

20. A drive axle assembly for use in a motor vehicle having a powertrain and a pair of wheels, comprising:
an input shaft adapted to receive drive torque from the powertrain;
a pair of axleshafts adapted for connection to the pair of wheels;
a differential having an input member and a pair of output members connected to said pair of axleshafts;
a pinion shaft driving said input member of said differential; and
a torque transmission unit operable for transferring drive torque from said input shaft to said pinion shaft, said torque transmission unit including a friction clutch operably disposed between said input shaft and said pinion shaft and a clutch actuator for controlling engagement of said friction clutch, said clutch actuator including a fluid pump, a rotary operator and a thrust mechanism, said fluid pump is operable for generating fluid pressure in proportion to the magnitude of a rotary speed differential between said input shaft and said pinion shaft, said rotary operator includes first and second components defining an actuation chamber therebetween which is adapted to receive the fluid pressure generated by said pump, said first component being fixed for rotation with one of said input shaft and said pinion shaft and said second component is adapted to rotate relative to said first component in response to the fluid pressure in said actuation chamber, and said thrust mechanism is operable for applying a clutch engagement force to said friction clutch in response to rotation of said second component relative to said first component.

21. The drive axle assembly of claim 20 wherein location of said second component in a low pressure position relative to said first component causes said thrust mechanism to be located in a first position for applying a minimum clutch engagement force on said friction clutch, and wherein movement of said second component to a high pressure position relative to said first component causes said thrust mechanism to move to a second position for applying a maximum clutch engagement for on said friction clutch.

22. The drive axle assembly of claim 21 wherein movement of said second component from its low pressure position toward its high pressure position is caused by an increase in the fluid pressure delivered by said fluid pump to said actuation chamber in response to an increase in the rotary speed differential between said input shaft and said pinion shaft.

23. The drive axle assembly of claim 21 wherein said torque transmission unit further comprises:
a pump housing fixed for rotation with said input shaft and defining a pump chamber, said fluid pump is retained in said pump housing and has a first pump member driven by said input shaft and a second pump member driven with said pump housing; and
a fluid circuit including a first flow path for supplying fluid from a sump to an inlet of said fluid pump and a second flow path for supplying fluid from an outlet of said fluid pump to said actuator chamber.

24. The drive axle assembly of claim 21 wherein said first component of said rotary operator is a reaction ring having a cylindrical body segment and a plurality of radially inwardly extending lugs which define a series of channels therebetween, and wherein said second component is an actuator ring having a cylindrical body segment and a plurality of radially outwardly extending separators which extend into said channels so as to define a plurality of said actuation chambers between said lugs and separators, wherein said actuator chambers are in fluid communication with an outlet of said fluid pump, and wherein said fluid pump is operable to draw low pressure fluid from a sump and deliver high pressure fluid to said actuation chambers for controlling rotary movement of said actuator ring relative to said reaction ring.

25. The drive axle assembly of claim 24 wherein said actuator ring is fixed to a drive component of said thrust mechanism such that rotation of said drive component results in translational movement of a driven component of said thrust mechanism for controlling the magnitude of said clutch engagement force applied to said friction clutch.

26. The drive axle assembly of claim 25 wherein said thrust mechanism is a ball ramp unit with a first cam plate as its drive component, a second cam plate as its driven components, and rollers retained in cam tracks formed between said first and second cam plates, said cam tracks are configured to cause translational movement of said second cam plate in response to rotary movement of said first cam plate for causing corresponding translational movement of an apply plate relative to said friction clutch.

27. The drive axle assembly of claim 26 wherein an increase in fluid pressure in said actuation chambers causes said actuator ring to rotate in a first direction relative to said reaction ring for causing movement of said second cam plate from a first position toward a second position for axially moving said apply plate from a released position toward a locked position relative to said friction clutch, and wherein a decrease in fluid pressure in said actuation chambers causes said actuator ring to rotate in a second direction relative to said reaction ring for causing movement of said second cam plate toward its first position for axially moving said apply plate toward its released position.

28. An axle assembly for use in a motor vehicle having a powertrain and a pair of wheels, comprising:
    an input shaft adapted to receive drive torque from the powertrain;
    first and second axleshafts adapted for connection to the pair of wheels;
    a differential unit having an input member driven by said input shaft and first and second output members connected to said first and second axleshafts; and
    a torque transmission unit operable for limiting speed differentiation between said first and second axleshafts, said torque transmission unit including a friction clutch operably disposed between any two of said input member and said first and second output members, and a clutch actuator for controlling engagement of said friction clutch, said clutch actuator including a fluid pump, a rotary operator and a thrust mechanism, said fluid pump is operable for generating fluid pressure in proportion to the magnitude of a rotary speed differential between said first and second output members, said rotary operator including first and second components which define an actuation chamber that is adapted to receive the fluid pressure generated by said pump, said first component being fixed for rotation with said input member of said differential unit and said second component is adapted to rotate relative to said first component in response to the fluid pressure in said actuation chamber, and said thrust mechanism is operable for applying a clutch engagement force on said friction clutch in response to rotation of said second component relative to said first component.

29. The axle assembly of claim 28 wherein location of said second component in a low pressure position relative to said first component causes said thrust mechanism to be located in a first position for applying a minimum clutch engagement force on said friction clutch, and wherein movement of said second component to a high pressure position relative to said first component causes said thrust mechanism to move to a second position for applying a maximum clutch engagement for on said friction clutch.

30. The axle assembly of claim 29 wherein movement of said second component from its low pressure position toward its high pressure position is caused by an increase in the fluid pressure delivered by said fluid pump to said actuation chamber in response to an increase in the rotary speed differential between said first and second output members.

31. The axle assembly of claim 29 wherein said torque transmission unit further comprises:
    a pump housing fixed for rotation with said input member and defining a pump chamber, said fluid pump is retained in said pump housing and has a first pump member driven with said input member and a second pump member driven with said pump housing; and
    a fluid circuit including a first flow path for supplying fluid from a sump to an inlet of said fluid pump and a second flow path for supplying fluid from an outlet of said fluid pump to said actuator chamber.

32. The axle assembly of claim 29 wherein said first component of said rotary operator is a reaction ring having a cylindrical body segment and a plurality of radially inwardly extending lugs which define a series of channels therebetween, and wherein said second component is an actuator ring having a cylindrical body segment and a plurality of radially outwardly extending separators which extend into said channels so as to define a plurality of said actuation chambers are between said lugs and separators, wherein said actuator chambers are in fluid communication with an outlet of said fluid pump, and wherein said fluid pump is operable to draw low pressure fluid from a sump and deliver high pressure fluid to said actuation chambers for controlling rotary movement of said actuator ring relative to said reaction ring.

33. The axle assembly of claim 32 wherein said actuator ring is fixed to a drive component of said thrust mechanism such that rotation of said drive component results in translational movement of a driven component of said thrust mechanism for controlling the magnitude of said clutch engagement force applied to said friction clutch.

34. The axle assembly of claim 33 wherein said thrust mechanism is a ball ramp unit with a first cam plate as its drive component, a second cam plate as its driven components, and rollers retained in cam tracks formed between said first and second cam plates, wherein said cam tracks are configured to cause translational movement of said second cam plate in response to rotary movement of said first cam plate for causing corresponding movement of an apply plate relative to said friction clutch.

35. The axle assembly of claim 34 wherein an increase in fluid pressure in said actuation chambers causes said actuator ring to rotate in a first direction relative to said reaction ring for causing angular movement of said first cam plate which causes said second cam plate to axially move said apply plate from a released position toward a locked position relative to said friction clutch, and wherein a decrease in fluid pressure in said actuation chambers causes said actuator ring to rotate in a second direction relative to said reaction ring for causing angular movement of said first cam plate which causes said second cam plate to axially move said apply plate toward its released position.

36. A power transfer device for use in a motor vehicle having a powertrain and first and second drivelines comprising:
    a first shaft driven by the powertrain and adapted for connection to the first driveline;
    a second shaft adapted for connection to the second driveline; and
    a torque transmission unit for transferring drive torque from said first shaft to said second shaft, said torque transmission unit including a friction clutch operably disposed between said first shaft and said second shaft, and a clutch actuator for controlling engagement of said friction clutch, said clutch actuator including a fluid pump, a rotary operator and a thrust mechanism, said fluid pump is operable for generating fluid pressure in proportion to the magnitude of a rotary speed differential between said first and second shafts, said rotary operator including first and second components defining an actuation chamber that is adapted to receive the fluid pressure generated by said pump, said first component being fixed for rotation with one of said first and second shafts and said second component adapted to rotate relative to said first component in response to the fluid pressure in said actuation chamber, and said thrust mechanism is operable for applying a clutch engagement force on said friction clutch in response to rotation of said second component relative to said first component.

37. The power transfer device of claim 36 wherein movement of said second component to a low pressure position relative to said first component causes said thrust mechanism to be located in a first position for applying a minimum clutch engagement force on said friction clutch, and wherein movement of said second component to a high pressure position relative to said first component causes said thrust mechanism to move to a second position for applying a maximum clutch engagement for on said friction clutch.

38. The power transfer device of claim 37 wherein movement of said second component from its low pressure position toward its high pressure position is caused by an increase in the fluid pressure delivered by said fluid pump to said actuation chamber in response to an increase in the rotary speed differential between said first and second shafts.

39. The power transfer device of claim 37 wherein said torque transmission unit further comprises:
 a pump housing fixed for rotation with said first shaft and defining a pump chamber, said fluid pump is retained in said pump housing and has a first pump member driven with said first shaft and a second pump member driven with said pump housing; and
 a fluid circuit including a first flow path for supplying fluid from a sump to an inlet of said fluid pump and a second flow path for supplying fluid from an outlet of said fluid pump to said actuator chamber.

40. The power transfer device of claim 37 wherein said first component of said rotary operator is a reaction ring having a cylindrical body segment and a plurality of radially inwardly extending lugs which define a series of channels therebetween, and wherein said second component is an actuator ring having a cylindrical body segment and a plurality of radially outwardly extending separators which extend into said channels so as to define a plurality of said actuation chambers between said lugs and separators, said actuator chambers in fluid communication with an outlet of said fluid pump, and wherein said fluid pump is operable to draw low pressure fluid from a sump and deliver high pressure fluid to said actuation chambers for controlling rotary movement of said actuator ring relative to said reaction ring.

41. The power transfer device of claim 40 wherein said actuator ring is fixed to a drive component of said thrust mechanism such that rotation of said drive component results in translational movement of a driven component of said thrust mechanism for controlling the magnitude of said clutch engagement force applied to said friction clutch.

42. The power transfer device of claim 41 wherein said thrust mechanism is a ball ramp unit with a first cam plate as its drive component, a second cam plate as its driven components, and rollers retained in cam tracks formed between said first and second cam plates, said cam tracks are configured to cause translational movement of said second cam plate in response to rotary movement of said first cam plate for causing corresponding movement of an apply plate relative to said friction clutch.

43. The power transfer device of claim 42 wherein an increase in fluid pressure in said actuation chambers causes said actuator ring and said first cam plate to rotate in a first direction relative to said reaction ring for causing movement of said second cam plate for axially moving said apply plate from a released position toward a locked position relative to said friction clutch, and wherein a decrease in fluid pressure in said actuation chambers causes said actuator ring and said first cam plate to rotate in a second direction relative to said reaction ring for causing movement of said second cam plate for axially moving said apply plate toward its released position.

44. A power transfer device for use in a motor vehicle having a powertrain and first and second drivelines, comprising:
 an input member adapted to receive drive torque from said powertrain;
 a first output member adapted to provide drive torque to the first driveline;
 a second output member adapted to provide drive torque to the second driveline;
 a gearset operably interconnecting said input member to said first and second output members; and
 a torque transmission unit for limiting speed differentiation between said first and second output members, said torque transmission unit including a friction clutch operably disposed between any two of said input member and said first and second output members, and a clutch actuator for controlling engagement of said friction clutch, said clutch actuator including a fluid pump, a rotary operator and a thrust mechanism, said fluid pump is operable for generating fluid pressure in proportion to the magnitude of a rotary speed differential between said first and second output members, said rotary operator includes first and second components defining an actuation chamber therebetween that is adapted to receive the fluid pressure generated by said pump, said first component being fixed for rotation with one of said input and output members and said second component adapted to rotate relative to said first component in response to the fluid pressure in said actuation chamber, and said thrust mechanism is operable for applying a clutch engagement force on said friction clutch in response to rotation of said second component relative to said first component.

45. The power transfer device of claim 44 wherein movement of said second component to a low pressure position relative to said first component causes said thrust mechanism to be located in a first position for applying a minimum clutch engagement force on said friction clutch, and wherein movement of said second component to a high pressure position relative to said first component causes said thrust mechanism to move to a second position for applying a maximum clutch engagement for on said friction clutch.

46. The power transfer device of claim 45 wherein movement of said second component from its low pressure position toward its high pressure position is caused by an increase in the fluid pressure delivered by said fluid pump to said actuation chamber in response to an increase in the rotary speed differential between said first and second output members.

47. The power transfer device of claim 45 wherein said torque transmission unit further comprises:
 a pump housing fixed for rotation with said input member and defining a pump chamber, said fluid pump is retained in said pump housing and has a first pump member driven by said input member and a second pump member driven with said pump housing; and
 a fluid circuit including a first flow path for supplying fluid from a sump to an inlet of said fluid pump and a second flow path for supplying fluid from an outlet of said fluid pump to said actuator chamber.

48. The power transfer device of claim 45 wherein said first component of said rotary operator is a reaction ring having a cylindrical body segment and a plurality of radially inwardly extending lugs which define a series of channels therebetween, and wherein said second component is an actuator ring having a cylindrical body segment and a plurality of radially outwardly extending separators which extend into said channels so as to define a plurality of said actuation chambers between said lugs and separators, wherein said actuator chambers are in fluid communication with an outlet of said fluid pump, and wherein said fluid pump is operable to draw low pressure fluid from a sump and deliver high pressure fluid to said actuation chambers for controlling rotary movement of said actuator ring relative to said reaction ring.

49. The power transfer device of claim 48 wherein said actuator ring is fixed to a drive component of said thrust mechanism such that rotation of said drive component results in translational movement of a driven component of said thrust mechanism for controlling the magnitude of said clutch engagement force applied to said friction clutch.

50. The power transfer device of claim 49 wherein said thrust mechanism is a ball ramp unit with a first cam plate as its drive component, a second cam plate as its driven components, and rollers retained in cam tracks formed between said first and second cam plates, said cam tracks configured to cause translational movement of said second cam plate in response to rotary movement of said first cam plate, and wherein said second cam plate is arranged to cause corresponding movement of an apply plate relative to said friction clutch.

51. The power transfer device of claim 50 wherein an increase in fluid pressure in said actuation chambers causes said actuator ring and said first cam plate to rotate in a first direction relative to said reaction ring for causing said second cam plate to axially move said apply plate from a released position toward a locked position relative to said friction clutch, and wherein a decrease in fluid pressure in said actuation chambers causes said actuator ring and said first cam plate to rotate in a second direction relative to said reaction ring for causing said second cam plate to axially move said apply plate toward its released position.

52. A torque transmission unit for use in a motor vehicle having a powertrain and a driveline, comprising:
an input member driven by the powertrain;
an output member driving the driveline;
a clutch pack operably disposed between said input and output members;
an apply plate moveable relative to said clutch pack between a first position and a second position, said apply plate is operable in its first position to apply a minimum clutch engagement force on said clutch pack and said apply plate is operable in its second position to apply a maximum clutch engagement force on said clutch pack; and
a clutch actuator for controlling movement of said apply plate between its first and second positions, said clutch actuator including a fluid pump, a rotary operator and a thrust mechanism, said fluid pump is operable to generate fluid pressure in proportion to the magnitude of a rotary speed difference between said input member and said output member, said rotary operator including first and second components that are coaxially arranged to define an actuation chamber therebetween which is adapted to receive the fluid pressure generated by said fluid pump, said first component of said rotary operator is fixed for rotation with one of said input and output members and said second component is adapted to rotate relative to said first component in response to the fluid pressure in said actuation chamber, and said thrust mechanism is operable to move said apply plate between its first and second positions in response to rotation of said second component relative to said first component.

53. The torque transmission unit of claim 52 wherein movement of said second component to a first position relative to said first component causes said thrust mechanism to locate said apply plate in its first position, and wherein movement of said second component to a second position relative to said first component causes said thrust mechanism to locate said apply plate in its second position.

54. The torque transmission unit of claim 53 wherein said torque transmission unit further includes a biasing mechanism for biasing said second component toward its first position.

55. The torque transmission unit of claim 53 wherein movement of said second component from its first position toward its second position is caused by an increase in the fluid pressure delivered by said fluid pump to said actuation chamber in response to an increase in the rotary speed differential between said input and output members.

56. The torque transmission unit of claim 53 wherein said torque transmission unit further comprises:
a pump housing fixed for rotation with said input member and defining a pump chamber, said fluid pump is retained in said pump housing and has a first pump member driven by said input member and a second pump member driven with said pump housing; and
a fluid circuit including a first flow path for supplying fluid from a sump to an inlet of said fluid pump and a second flow path for supplying fluid from an outlet of said fluid pump to said actuator chamber.

57. The torque transmission unit of claim 56 wherein said second flow path includes a pressure relief valve operable to limit the fluid pressure delivered to said actuator chamber.

58. The torque transmission unit of claim 56 wherein said pump housing defines an operator chamber with said rotary operator disposed in said operator chamber, said first component of said rotary operator is fixed to said pump housing for rotation with said input member and said second component is coaxially aligned with said first component so as to define said actuation chamber therebetween.

59. The torque transmission unit of claim 58 wherein said first component of said rotary operator is a reaction ring having a cylindrical body segment and plurality of inwardly projecting lugs so as to define a plurality of channels therebetween, and wherein said second component of said rotary actuator is an actuator ring having a cylindrical body segment and outwardly projecting separators which extend into said channels so as to define a series of actuation channels between adjacent pairs of lugs and separators.

60. The torque transmission unit of claim 53 wherein said first component of said rotary operator is a reaction ring having a cylindrical body segment and a plurality of radially inwardly extending lugs which define a series of channels therebetween, and wherein said second component is an actuator ring having a cylindrical body segment and a plurality of radially outwardly extending separators which extend into said channels so as to define a plurality of said actuation chambers between said lugs and separators, said actuator chambers are in fluid communication with an outlet of said fluid pump, and wherein said fluid pump is operable to draw low pressure fluid from a sump and deliver high pressure fluid to said actuation chambers for controlling rotary movement of said actuator ring relative to said reaction ring.

61. The torque transmission unit of claim 60 wherein said actuator ring is fixed to a drive component of said thrust mechanism such that rotation of said drive component results in translational movement of a driven component of said thrust mechanism for controlling the magnitude of said clutch engagement force applied to said friction clutch.

62. The torque transmission unit of claim 61 wherein said thrust mechanism is a ball ramp unit with a first cam plate as its drive component, a second cam plate as its driven components, and rollers retained in cam tracks formed between said first and second cam plates, wherein said cam tracks are configured to cause translational movement of said second cam plate in response to rotary movement of said first cam plate, and wherein said second cam plate is arranged to cause corresponding translational movement of an apply plate relative to said friction clutch.

63. The torque transmission unit of claim 62 wherein an increase in fluid pressure in said actuation chambers causes said actuator ring and said first cam plate to rotate in a first direction relative to said reaction ring for causing said second cam plate to axially move said apply plate from a released position toward a locked position relative to said friction clutch, and wherein a decrease in fluid pressure in said actuation chambers causes said actuator ring and said first cam plate to rotate in a second direction relative to said reaction ring for causing said second cam plate to axially move said apply plate toward its released position.

64. The torque transmission unit of claim 62 wherein a leakage flow path is provided in said actuator chambers to permit fluid therein to return to said sump so as to accommodate movement of said actuator ring in its second direction relative to said reaction ring.

* * * * *